(No Model.)
T. GLEASON.
TAMPING BAR.
No. 354,698. Patented Dec. 21, 1886.
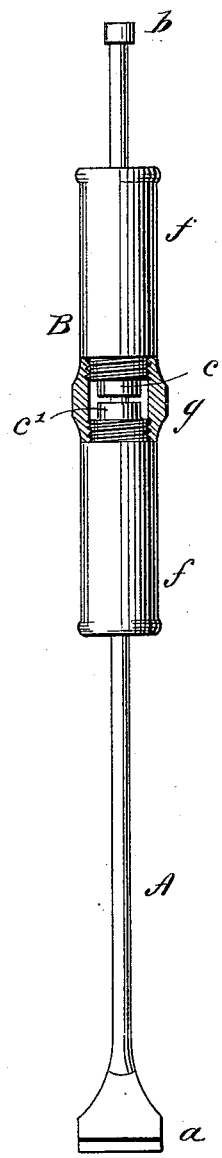
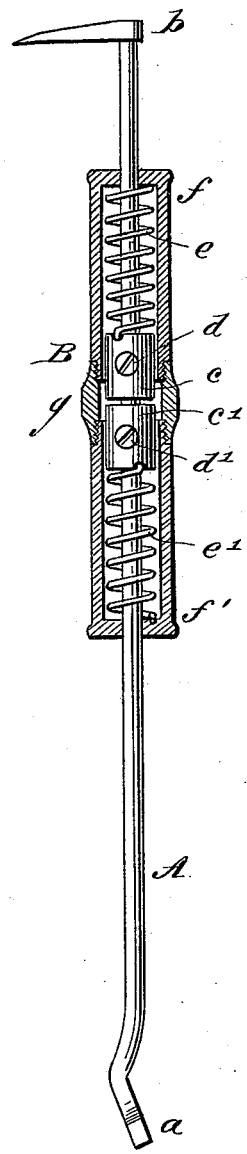
WITNESSES:
Donn Twitchell
C. Sedgwick
INVENTOR
T. Gleason
BY Munn & Co
ATTORNEY

UNITED STATES PATENT OFFICE.

TIMOTHY GLEASON, OF RED WING, MINNESOTA.

TAMPING-BAR.

SPECIFICATION forming part of Letters Patent No. 354,698, dated December 21, 1886.

Application filed April 22, 1886. Serial No. 199,858. (No model.)

*To all whom it may concern:*

Be it known that I, TIMOTHY GLEASON, of Red Wing, in the county of Goodhue and State of Minnesota, have invented a new and useful Improvement in Tamping-Bars, of which the following is a specification, reference being had to the annexed drawings, forming a part thereof, in which—

Figure 1 is a side elevation, partly in section, of my improved tamping-bar. Fig. 2 is a horizontal section.

Similar letters of reference indicate corresponding parts in both figures of the drawings.

The object of my invention is to provide a tamping-bar with a yielding handle which will permit of the handling of the bar without undue exertion of the user.

My invention consists in a tamping-bar having ends of the usual form, and having in a suitable position in its length adjustable collars with spiral springs on opposite sides thereof and a casing or hollow handle inclosing the adjustable collars and the springs, so that movement is imparted to the tamping-bar through the medium of the springs.

The tamping-bar A is of the usual size and form, having a widened portion or spud, $a$, at one end, and provided with a removable pick, $b$, at the opposite end. Upon the body of the bar A are placed two collars, $c\ c'$, which are clamped in place on the bar by set-screws $d\ d'$. Above and below the collars $c\ c'$ are placed spiral springs $e\ e'$. The hollow handle B, formed of tubes $f f'$, having centrally-apertured closed ends which fit the body of the bar A and threaded inner ends received in the threaded thimble $g$, incloses the collars $c\ c'$ and the springs $e\ e'$. The hollow handle B may be adjusted along the length of the bar A by loosening the screws $d\ d'$ and moving the collars $c\ c'$ to the desired position, and then clamping them by means of the screws. The normal compression of the springs $e\ e'$ may be regulated by separating the collars $c\ c'$ more or less.

When the tamping-bar A is driven downward in the operation of tamping, the hollow handle B is forced downward, imparting motion to the bar A through the spring $e$, and when the hollow handle B is raised motion is imparted to the bar A through the spiral spring $e'$.

By means of the springs $e\ e'$, interposed between the collars $c\ c'$ and the ends of the hollow handle, the jar and shock which is commonly experienced by the workman using the ordinary tamping-bar is avoided, and the workman is enabled to use the bar without inconvenience or undue fatigue.

Having thus described my invention, what I claim as new, and desire to secure by Letters Patent, is—

1. The combination, with a tamping-bar, of a spring-handle, substantially as herein shown and described.

2. The combination, with the bar A, of one or more adjustable collars, springs placed on opposite sides of the collar or collars, and the hollow handle inclosing the springs and collar or collars, substantially as herein shown and described.

3. The combination, with the tamping-bar A, of adjustable collars $c c'$, springs $e e'$, and the hollow handle B, inclosing the collars, springs, and a portion of the tamping-bar, substantially as herein shown and described.

4. The combination, with the tamping-bar A, of adjustable collars $c\ c'$, springs $e\ e'$, and a hollow handle, B, formed of the tubes $f f'$, threaded at their inner ends and connected by the internally-threaded thimble $g$, substantially as herein shown and described.

TIMOTHY GLEASON.

Witnesses:
S. J. HASLER,
THOMAS QUINLAN.